United States Patent
Cofino et al.

[11] Patent Number: 5,966,082
[45] Date of Patent: Oct. 12, 1999

[54] METHOD OF FLAGGING PARTIAL WRITE IN RF TAGS

[75] Inventors: Thomas Anthony Cofino, Rye; Daniel Joseph Friedman, Tarrytown, both of N.Y.; Kenneth Alan Goldman, Norwalk, Conn.; Harley Kent Heinrich, Brewster, N.Y.

[73] Assignee: Intemec IP Corp., Woodland Hills, Calif.

[21] Appl. No.: 08/862,912

[22] Filed: May 23, 1997

[51] Int. Cl.⁶ .................................................. H04Q 5/22
[52] U.S. Cl. .................. 340/825.54; 340/571; 340/573; 342/51
[58] Field of Search .................... 340/825.54, 571, 340/572, 573; 342/51, 42

[56] References Cited

U.S. PATENT DOCUMENTS

| | | | |
|---|---|---|---|
| 4,525,713 | 6/1985 | Barletta et al. | 340/825.54 |
| 5,257,011 | 10/1993 | Beigel | 340/572 |
| 5,777,561 | 7/1998 | Chieu et al. | 340/825.54 |
| 5,829,032 | 10/1998 | Komuro et al. | 711/141 |

*Primary Examiner*—Michael Horabik
*Assistant Examiner*—Anthony A. Asongwed
*Attorney, Agent, or Firm*—Rodney T. Hodgson

[57] ABSTRACT

A method, system, and apparatus for sending data from a base station to an RF tag, whereby the RF tag comprises an "intention to write to memory" field, and the "intention to write to memory" field is written before writing the data and cleared after the data is successfully written. If the data transmission is interrupted and partial data is written to the tag, the "intention to write to memory" field will not have been cleared when the tag is checked at a later time through interrogation by a base station.

15 Claims, 2 Drawing Sheets

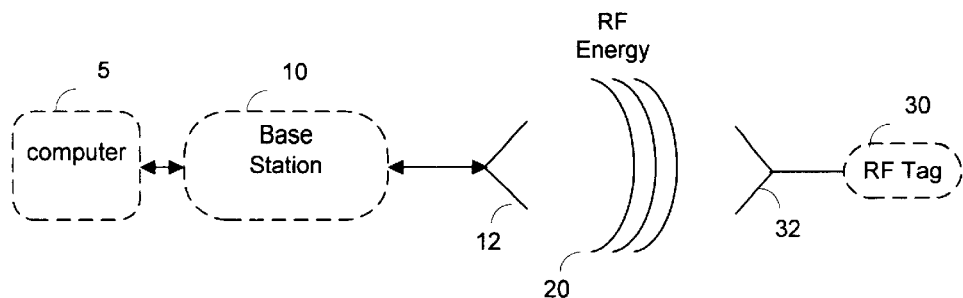
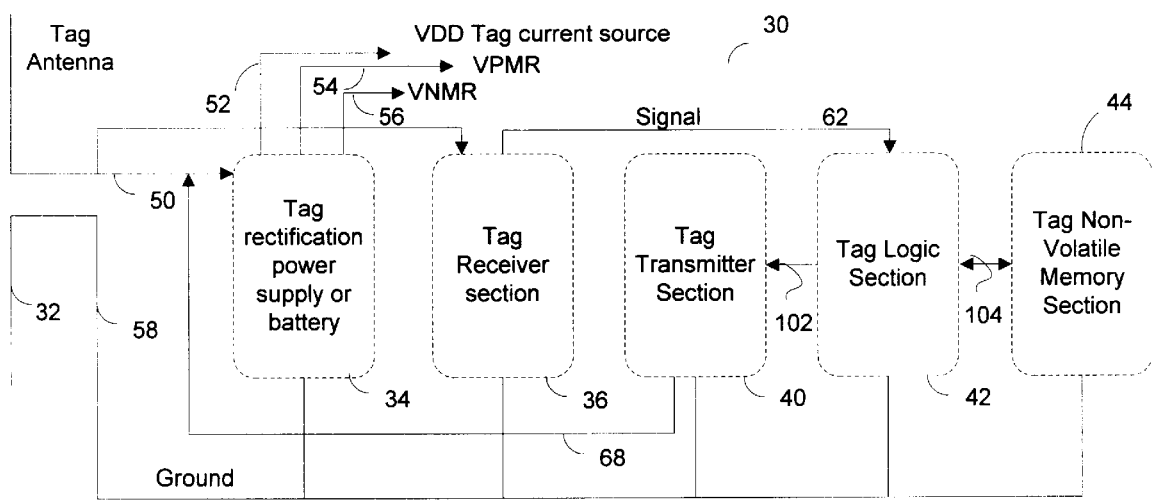
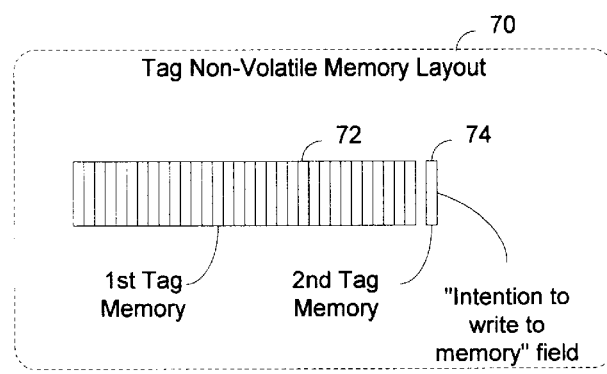

METHOD OF FLAGGING PARTIAL WRITE IN RF TAGS

FIELD OF THE INVENTION

The field of the invention is the field of Radio Frequency (RF) Transponders (RF Tags), wherein a Base Station sends power and information to one or more RF Tags which contain logic and memory circuits for storing information about objects, people, items, or animals associated with the RF Tags. The RF Tags can be used for identification and location (RFID Tags) of objects and to send information to the base station by modulating the load on an RF Tag antenna.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna can be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor.

Prior art tags have used electronic logic and memory circuits and receiver circuits and modulator circuits for receiving information from the base station and for sending information from the tag to the base station.

U.S. Pat. No 5,214,410, hereby incorporated by reference, teaches a method for a base station to communicate with a plurality of Tags.

Prior art tags typically use a number of discrete components connected together with an antenna. However, to substantially reduce the cost of the tags, a single chip connected to an antenna must be used. In order to increase the range of passive tags, and to conserve battery life of active tags, the minimum current necessary for the tag functions must be used.

Prior art tags may have information written to the tag memory. Typically, the information is written a single byte at a time. If the communication is interrupted after one or more bytes are successfully written, but before all the information needed to write the field is transferred, wrong information, such as an incorrect bank balance, could be carried away by the tag.

RELATED APPLICATIONS

Copending patent applications assigned to the assignee of the present invention and hereby incorporated by reference, are:

Ser. No. 08/303,965 filed Sep. 9, 1994 entitled RF Group Select Protocol, by Cesar et. al;

Ser. No. 08/304,340 filed Sep. 9, 1994 entitled Multiple Item RF ID protocol, by Chan et. al.;

Ser. No. 08/521,898 filed Aug. 31, 1995 entitled Diode Modulator for RF Transponder by Friedman et al.;

application submitted Aug. 9, 1996 entitled RFID System with Broadcast Capability by Cesar et al.;

application submitted Jul. 29, 1996 entitled RFID transponder with Electronic Circuitry Enabling and Disabling Capability, by Heinrich et al.

application submitted on the same date as the present application entitled Write__OK flag for passive radio frequency (Rf) transponders (rf tags) by D. Friedman and K. Rapp, application submitted on the same date as the present application entitled Method of using write__ok flag for radio frequency (rf) transponders (rf tags), by Tom Cofino, Dan Friedman, Ken Goldman, and Harley Heinrich.

SUMMARY OF THE INVENTION

A field in non-volatile memory of an RF tag is defined as an "intention to write to memory" field. This field may be only a single bit (or flag). It would normally be cleared. When a base station wants to send multi-byte data for a tag to write to a field or fields in the tag non-volatile memory, the base station would write the one bit (set the flag). After the flag has been set, the base station would then start the "write to memory" procedure. When all the bytes of the field or fields have been correctly written and checked, the base station would then clear the flag. If communication with the tag was interrupted before all the bytes have been written, the flag would remain set, and a base station in a later communication session would check the flag and would know that the memory may contain wrong information. If the "intention to write to memory" field contains more than one bit, more information, such as the name or address of the target field, may be stored, so that the base station would know exactly which data in the tag memory is suspect if the "intention to write to memory" field is not cleared.

BRIEF DESCRIPTION OF THE DRAWINGS

FIG. 1 is a sketch of a system of base station and RF tag.

FIG. 2 is a block diagram of an RF tag.

FIG. 3 is a block diagram of the layout of the non volatile memory of an RF tag.

DETAILED DESCRIPTION OF THE INVENTION

Figure 4:
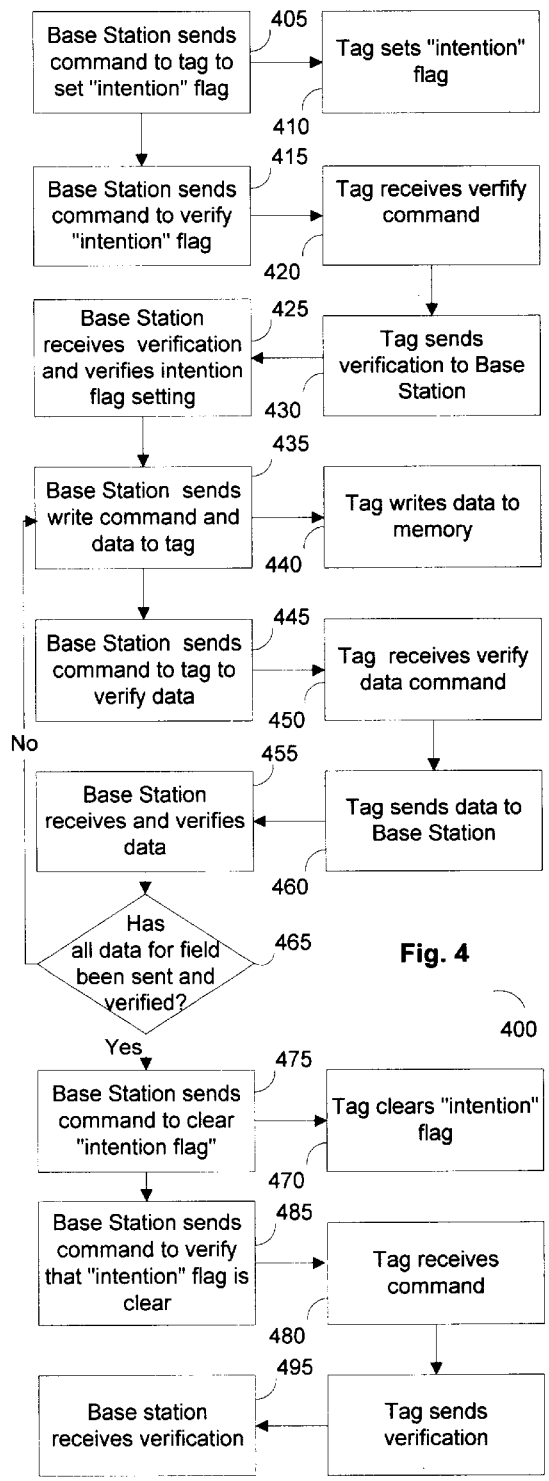
FIG. 4 is a flow chart of a method of the invention.

In RF tag communication protocol, data is sent to be written to the memory of the RF tag a particular number of bytes at a time. At the present time, the data is sent a single byte at a time, but 2, 4, or more bytes could be sent depending on the protocol chosen.

The problem to be solved is that the communication with the tag may fail in the middle of the communication procedure. The tag may be moving with respect to the base station, or there may be sources of interference which interfere with the base station—tag communication procedures. Procedures for writing a single byte, and checking that the byte is written correctly, presented in copending applications entitled WRITE_OK FLAG FOR PASSIVE RADIO FREQUENCY (RF) TRANSPONDERS (RF TAGS) by D. Friedman and K. Rapp, and METHOD OF USING WRITE_OK FLAG FOR RADIO FREQUENCY (RF) TRANSPONDERS (RF TAGS), by the inventors of the present invention, are filed simultaneously with the present application. If the field being written contains more than one byte of information, (or, more generally, if the field being written is larger than can be written in a single write operation), incorrect information could be left in the field if communication is interrupted after the successful writing of one byte of the multibyte field. This might be particularly injurious for example, in the case that the field was "bank balance". The method of the invention uses a field in the non-volatile memory which is defined as an "intention to write to memory" field. This field may be only a single bit (or flag). It would normally be clear. When a base station wants to send data for a tag to write to memory, the base station instructs the tag to write the one bit (set the flag). After the flag has been set, the base station then starts the "write to memory" procedure. When the entire field or fields have been correctly written and checked, the base station instructs the tag to clear the flag. If communication with the tag is interrupted in the middle of the multibyte write procedure, the flag would remain set, and a base station in a later communication session would check the flag and would know that the memory may contain wrong information. If the "intention to write to memory" field contains more than one bit, more information such as the address of the proposed data, may be stored, so that the base station would know exactly which data in the tag memory was suspect if the "intention to write to memory" field is not clear.

FIG. 1 shows a system of a base station 10 having an associated computer 5 sending RF energy 20 from base station antenna 12 to a tag antenna 32 associated with an RF tag 30. The RF frequency $f_0$ is preferably above 100 MHZ, more preferably above 900 MHZ, and most preferably above 2,300 MHZ. The RF signal is preferably amplitude modulated at a frequency $f_1$ greater than 1 Khz, more preferably between 5 and 150 Khz, and most preferably between 20 and 60 Khz. However, the RF signal may also be modulated by frequency modulation or by phase modulation methods, as is well known in the art of RF signal propagation. The RF tag 30 may be a passive tag which receives all the energy needed to carry out the tag functions from the RF field broadcast by the base station, or it may be an active tag which carries a battery to store the required energy. Both types of tags may change the loading on the tag antenna 32 to change the antenna reflectivity and thus communicate with the base station 10.

FIG. 2 shows a block diagram of the tag antenna 32 and part of the RF tag 30. The RF antenna 32 feeds RF power to the tag rectification power supply 34. A battery tag would replace block 34 with a battery (not shown). In the embodiment shown in FIG. 2, a tag rectification signal receiving section 36 comprising an RF diode, a signal capacitor, and a signal capacitor current drain is separate from the tag rectification power supply, but the invention is also contemplated in the case that section 36 is part of the tag rectification power supply 34. The tag power supply 34 supplies current at voltages VDD, and optionally voltages VPMR, and VNMR on lines 52, 54, and 56 respectively. These lines are used to power and control the various devices on the tag. The RF antenna 32 has two connections to the tag 30, denoted here by lines 50 and 58. Line 58 is the conventional ground.

The tag rectification signal receiving section 36 receives an RF signal which is preferably amplitude modulated at a frequency $f_1$ from the antenna 32 over line 50, and rectifies and demodulates the RF signal and delivers a digital signal to the tag logic section 42 over line 62. The tag logic section 42 may write data to the tag non-volatile memory section 44 over line 104. The tag logic section may contain volatile memory elements such as latches such that the volatile memory is lost if the tag loses power. The tag non-volatile memory section 44 may be a technology such as Electrically Eraseable Programmable Read Only Memory ($E^2$PROM).

The tag transmitter section 40 receives data over line 102 from the tag logic section 42 and the tag non-volatile memory section 44 for modulating the impedance of the tag antenna 32 using line 68. The modulation of the antenna impedance changes the backscattered energy from the antenna 32 and transmits signals from the tag to the base station 10.

FIG. 3 is a block diagram of the layout of memory 70 of the tag non-volatile memory section 44. The tag non-volatile memory is laid out as a first tag memory 72 and a second tag memory 74. The first tag memory is the conventional non-volatile memory of an RF tag which contains, for example, a unique tag identifying number, and other data such as a UPC code and a price, for example. The second tag memory 74 is a non-volatile field called an "intention to write to memory" field.

The "intention to write to memory" field 74 may consist of a single bit, which may be called a "flag", or it may comprise more than one bit.

If the "intention to write to memory" field 74 consists of more than one bit, the "intention to write to memory" field could contain information about which field in the first memory 72 was to be written, and in subsequent communication, the base station would know that only a certain field would be suspect. Many ways to write this information are clear to one skilled in the art. The address of a particular field in first memory 72 to be written could be encoded in the "intention to write to memory" field 74 as, for example, a start bit and a length or a start bit and a stop bit, or even a field name if the tag is sufficiently "smart" to recognize field names.

The procedure outlined above is sketched in the flow chart 400 of FIG. 4. First, the tag sends the data to the "intention to write to tag" field in step 405. The tag sets the "intention to write to memory" flag in step 410. The base station sends a "verify" command in step 415, which the tag receives in step 420. The tag sends the verification data to the base station in step 430 and the base station checks that the "intention" flag is correctly written in step 425. Then the base station sends a write command and the data which is to be written to the tag in step 435. The tag writes the data in step 440. The base station then sends a command to the tag to verify the data in step 445, and the tag returns the data to the base station in step 460. The base station checks the data in step 455. If only a single byte is to be sent the tag, the base station clears the "intention to write to tag" field and checks that the field has indeed been cleared in steps 470 to 490. If more bytes are to be sent to the tag, the decision step 465 returns the system to step 435 to continue the process of transferring the data to the tag. When all the data has been successfully transferred, the decision step 465 continues to step 475, where the base station sends a command to the tag to clear the "intention" flag. The tag complies in step 470. The base station sends a command to the tag to verify that the tag has indeed cleared the "intention" flag in step 485, and the tag receives the command and returns the verification in steps 480 and 490. The base station receives the verification in step 495, and ends the procedure.

Figure 5:
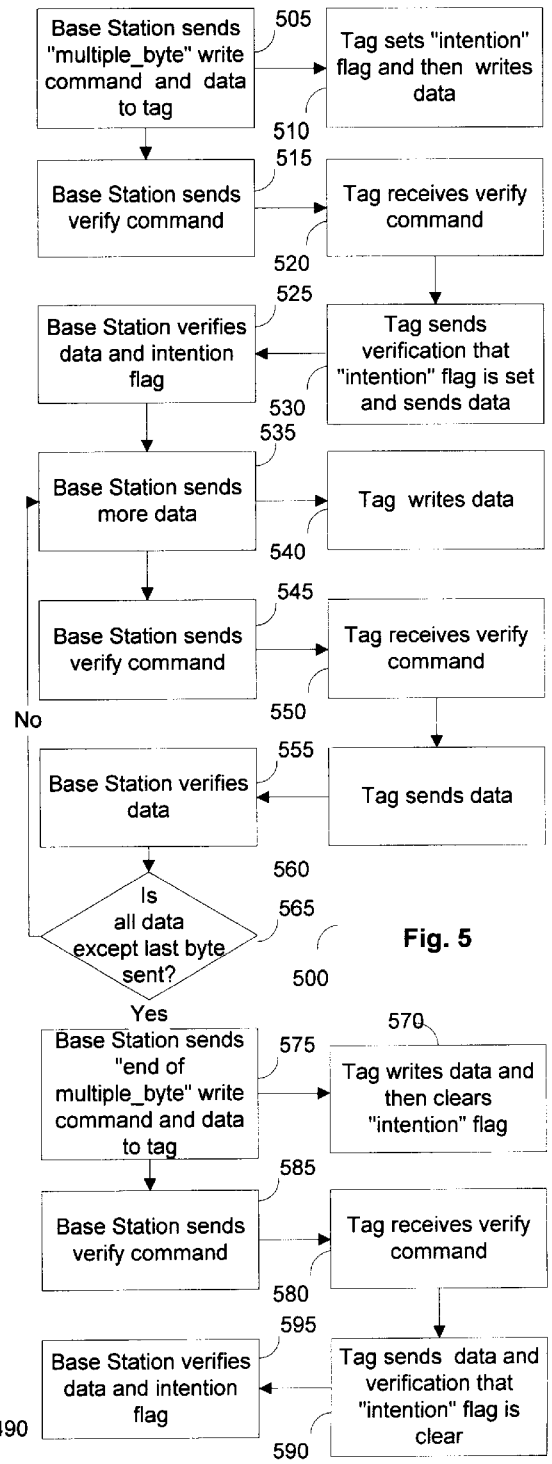
FIG. 5 is a flow chart of a method of the invention.

The embodiment outlined in FIG. 4 triples the time to write a single byte over the time to write a single byte in a prior art tag. If the tag is sufficiently "smart", a single command could be sent along with data. The tag would be sufficiently smart to realize that a multibyte write command implies setting the "intention" flag or field before writing the data. When the last data byte is sent, the "end of multibyte transmission" command tells the tag to clear the "intention" flag or field after writing the last byte. This procedure is especially advantageous, because writing to the tag takes less time. If the tag moved out of the field before the "intention" flag was set, no data would be written. If the tag moved out after the flag was set, but before or during the writing of the data, the base station would be able to tell at a later time that the data was suspect. This preferred embodiment is outlined in the flow chart 500 of FIG. 5. First, the base station sends a "multiple_byte" write command to the tag, along with the first byte or bytes of data in step 505. The tag sets the "intention to write to memory" flag and writes the transmitted data in step 510. The base station sends a "verify" command in step 515, which the tag receives in step 520. The tag sends the verification data to the base station in step 530 and the base station checks that the "intention" flag is correctly written and that the data sent is correctly written in step 525. Then the base station sends a write command and the next data which is to be written to the tag in step 535. The tag writes the data in step 540. The base station then sends a command to the tag to verify the data in step 545, and the tag returns the data to the base station in step 560. The base station checks the data in step 555. If all the data except the last byte has not been transmitted, the decision step 565 returns the system to step 535 to continue the process of transferring the data to the tag. If all the data except the last byte has been transmitted, the decision step 565 continues to step 575, where the base station sends an "end of multiple_byte" command to the tag. The tag writes the last data to the tag memory, then clears the "intention" flag in step 570. The base station sends a command to the tag to verify that the tag has indeed cleared the "intention" flag and written the data in step 585, and the tag receives the command and returns the verification and data in steps 580 and 590. The base station receives the verification and data in step 595, and ends the procedure. Sufficiently smart tags would know that a write command is always followed by a "verify" command, and could send back data successfully written without being so commanded.

In the case of tags such as E²PROM non-volatile memory tags where a higher voltage is needed to write to the non-volatile tag memory than to run the tag electronics outlined in applications entitled WRITE_OK FLAG FOR PASSIVE RADIO FREQUENCY (RF) TRANSPONDERS (RF TAGS) by D. Friedman and K. Rapp, and METHOD OF USING WRITE_OK FLAG FOR RADIO FREQUENCY (RF) TRANSPONDERS (F TAGS), by the inventors of the present invention, submitted simultaneously with the present application, the "write_OK" procedure would be followed to ensure that the tag voltage is high enough to correctly write the intention bit and the data in the tag non-volatile memory.

In the case of technologies such as Ferroelectric Random Access Memory (FRAM) technology, the "write_OK" procedure is not necessary, since the non-volatile memory will be written as long as the tag electronics has enough voltage to continue working. This is also the case with the battery tag, since the battery tag will use SRAM memory. In all cases, however, a field or flag must be set in non-volatile memory before writing to the non-volatile memory, and the field or flag changed after writing to the non-volatile tag memory, to ensure that the communication and data transfer are complete and not interrupted by the motion of the tag in the field or by changing conditions during the tag writing procedure.

We claim:

1. A method of sending data from a base station to a radio frequency (RF) transponder (RF tag), the RF tag having a tag non-volatile memory, the tag non-volatile memory, comprising first memory and a second memory, the second memory comprising an "intention to write to memory" field, comprising;
    a) writing information in the second memory; then
    b) writing the data to the first memory; then
    c) checking whether the data was successfully written to the first memory; and then
    d) clearing the information from the second memory after successful writing the data to the first memory.

2. The method of claim 1, where the information written in the second memory is a single bit.

3. The method of claim 1, where the information written in the second memory is a description of the data to be written in the first memory.

4. The method of claim 1, where the information written in the second memory is an address of data to be written in the first memory.

5. The method of claim 1, where the information written in the second memory is a name of a field to be written in the first memory.

6. A method of sending data from a base station to an RF tag having a tag non-volatile memory and
    writing the data to an address in a first part of the tag non-volatile memory, comprising;
    a) reserving a second part of the tag non volatile memory as an "intention to write to memory" field;
    b) encoding the address in the "intention to write to memory" field;
    c) writing the data to the address in the first part of the tag non-volatile memory;
    d) checking whether the data is successfully written to the address in the first part of the tag non-volatile memory; and
    e) clearing the "intention to write to memory" field after successfully writing the data to the address in the first part of the tag non-volatile memory.

7. An RF tag, the RF Tag having a tag non-volatile memory, comprising;
   a first tag memory, the first tag memory being a first part of the tag non-volatile memory for holding data written to the tag;
   a second tag memory, the second tag memory being a second part of the tag non-volatile memory comprising an "intention to write to memory field", where the "intention to write to memory field" is written before the data is written to the first tag memory, and where the "intention to write to memory field" is cleared after successfully writing the data to the first tag memory.

8. The RF tag of claim 7, where the second tag memory is a single bit.

9. The RF tag of claim 7, where a description of the data to be written in the first tag memory is written in the second tag memory before the data is written in the first tag memory.

10. The RF tag of claim 9, where the description of the data to be written in the second tag memory is an address of the data to be written in the first tag memory.

11. The RF tag of claim 9, where the description of the data to be written in the second tag memory is a name of a field to be written in the second tag memory.

12. A system, comprising;
    a base station;
    an RF tag, comprising a tag non-volatile memory, the tag non-volatile memory comprising a first memory, the first memory for holding data written to the tag non-volatile memory, the tag non-volatile memory further comprising a second memory, the second memory comprising an "intention to write to memory field", where the "intention to write to memory field" is written before the data is written to the first memory, and where the "intention to write to memory field" is cleared after successfully writing the data to the first memory.

13. The system of claim 12, where the second memory is a single bit.

14. The system of claim 12, where the information written in the second tag memory is a description of the data to be written in the first memory.

15. The system of claim 12, where the information written in the second memory is an address of data to be written in the first memory.

* * * * *